United States Patent
Browne et al.

(10) Patent No.: US 9,488,241 B2
(45) Date of Patent: Nov. 8, 2016

(54) ENERGY ABSORBERS INCLUDING SHAPE MEMORY ALLOY PARTICLES

(71) Applicant: GM GLOBAL TECHNOLOGY OPERATIONS LLC, Detroit, MI (US)

(72) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 607 days.

(21) Appl. No.: 13/954,478

(22) Filed: Jul. 30, 2013

(65) Prior Publication Data

US 2014/0144736 A1 May 29, 2014

Related U.S. Application Data

(63) Continuation-in-part of application No. 13/686,843, filed on Nov. 27, 2012, now abandoned.

(51) Int. Cl.

| | |
|---|---|
| *F16F 9/30* | (2006.01) |
| *B32B 15/01* | (2006.01) |
| *B23K 35/02* | (2006.01) |
| *C22C 5/02* | (2006.01) |
| *C22C 9/01* | (2006.01) |
| *C22C 9/04* | (2006.01) |
| *C22C 14/00* | (2006.01) |
| *C22C 18/02* | (2006.01) |
| *C22C 19/00* | (2006.01) |

(52) U.S. Cl.
CPC .............. *F16F 9/30* (2013.01); *B23K 35/0244* (2013.01); *B32B 15/01* (2013.01); *B32B 15/011* (2013.01); *C21D 2201/01* (2013.01); *C21D 2211/001* (2013.01); *C21D 2211/008* (2013.01); *C22C 5/02* (2013.01); *C22C 9/01* (2013.01); *C22C 9/04* (2013.01); *C22C 14/00* (2013.01); *C22C 18/02* (2013.01); *C22C 19/007* (2013.01)

(58) Field of Classification Search
CPC ................................. F16F 9/30; B32B 15/01
See application file for complete search history.

(56) References Cited

U.S. PATENT DOCUMENTS

| | | | |
|---|---|---|---|
| 4,582,534 | A | 4/1986 | Torobin |
| 5,876,434 | A | 3/1999 | Flomenblit et al. |
| 7,431,981 | B2 | 10/2008 | Schneider |
| 8,006,759 | B1 | 8/2011 | Cochran, Jr. et al. |
| 2009/0043288 | A1 | 2/2009 | Petrakis |

FOREIGN PATENT DOCUMENTS

| | | | |
|---|---|---|---|
| CN | 101565973 A | * | 10/2009 |
| KR | 10-2011-0037665 | * | 4/2011 |

* cited by examiner

*Primary Examiner* — Humera Sheikh
*Assistant Examiner* — Lucas Wang
(74) *Attorney, Agent, or Firm* — Dierker & Kavanaugh, P.C.

(57) ABSTRACT

An energy absorber is disclosed herein. The energy absorber includes a structure defining a hollow interior portion. The energy absorber also includes a working volume defined in at least a portion of the hollow interior portion. The energy absorber further includes shape memory alloy (SMA) particles positioned within the working volume. The SMA particles have an Austenite finish temperature ($A_f$) that is lower than a temperature encountered in an application in which the energy absorber is used so that the SMA particles exhibit stress-induced superelasticity.

18 Claims, 3 Drawing Sheets

ENERGY ABSORBERS INCLUDING SHAPE MEMORY ALLOY PARTICLES

CROSS-REFERENCE TO RELATED APPLICATIONS

This application is a continuation-in-part of co-pending U.S. patent application Ser. No. 13/686,843, filed Nov. 27, 2012, which itself claims the benefit of U.S. Provisional Application Ser. No. 61/576,123, filed Dec. 15, 2011 and U.S. Provisional Application Ser. No. 61/576,147, filed Dec. 15, 2011, each of which is incorporated by reference herein in its entirety.

TECHNICAL FIELD

The present disclosure relates generally to energy absorbers including shape memory alloy particles.

BACKGROUND

A shape memory alloy is an alloy material that can be deformed, and then return to its original, pre-deformed shape when exposed to a suitable stimulus (e.g., heat). Shape memory alloys may be one-way materials that remember a single shape and that require deformation to create, for example, a low-temperature shape. Shape memory alloys may also be two-way materials that remember two different shapes, for example, one at low temperatures, and one at high temperatures.

SUMMARY

An energy absorber is disclosed herein. The energy absorber includes a structure defining a hollow interior portion. The energy absorber also includes a working volume defined in at least a portion of the hollow interior portion. The energy absorber further includes shape memory alloy (SMA) particles positioned within the working volume. The SMA particles have an Austenite finish temperature ($A_f$) that is lower than a temperature encountered in an application in which the energy absorber is used so that the SMA particles exhibit stress-induced superelasticity.

BRIEF DESCRIPTION OF THE DRAWINGS

Features and advantages of examples of the present disclosure will become apparent by reference to the following detailed description and the drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
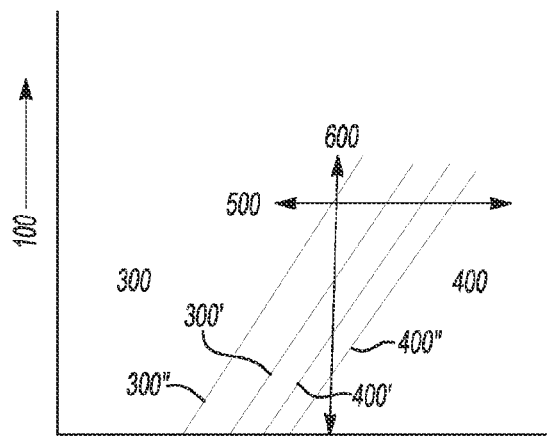
FIG. 1 is a stress and temperature based phase diagram for a shape memory alloy.

Example(s) of the energy absorbers disclosed herein include superelastic shape memory alloy (SMA) particles. The energy absorber(s) may be used in a variety of applications, ranging from cars, trucks, watercraft, all-terrain vehicles, aircraft, etc. Example energy absorbers according to the present disclosure may serve in damping structurally transmitted energy, resulting, for example, from acoustic and road noise vibration. In these instances, the energy absorbers may reduce the magnitude of vibrations transmitted therethrough, and thus may reduce the displacement of occupants and/or cargo in the vehicles. The energy absorber(s) disclosed herein may also serve in damping structurally transmitted energy due to inputs of a single non-varying frequency (i.e., impact loads) or inputs of time-varying vibrations with multiple and/or varying frequencies (i.e., random vibrations). An example of this may include impact or vibration loads due to stamping operations in plants. The energy absorber(s) may also be used, for example, for interlayer damping in armored vehicles, as dedicated crash energy absorbers (such as crash boxes), and in isolation and mounting elements positioned between occupants and the vehicle structure. As noted in these few examples, the energy absorbers with superelastic SMA particles may be useful in a variety of industries, including, for example, the automotive industry, the construction industry, and the aerospace industry.

One advantage of superelastic SMA particles is that they may be suitable for long term use, even after multiple deformations. This is due to the ability of the particles to return to their original pre-deformed shape once a stimulus is removed. As such, the SMA particles are able to maintain their functionality after multiple deformations. This particular property will be discussed further below.

In plots of stress versus strain for superelastic SMA particles, any cyclic variation in stress creates a loop on the plot. The area of that loop is equal to the mechanical energy dissipated as heat. It has been found that during superelastic deformation (discussed in detail below), internal interfaces between the Austenite and Martensite phases dissipate a substantial amount of available mechanical energy during their formation and motion. It is believed that up to 50% energy dissipation may be exhibited. It is also believed that the dissipation of mechanical energy may impart some mechanical damping characteristics to the superelastic SMA. The percent of the energy that is dissipated in a stress-strain cycle may be increased when the SMA hollow spheres are pre-stressed sufficiently in their packaged configuration. For example, pre-stressing may be accomplished by an external load, e.g., resulting from the packaged configuration supporting an engine block. In this configuration, the deformation cycle experienced by the SMA particle in the application of use starts beyond the small percentage deformation (approximately 1 percent) purely elastic response of the superelastic SMA. It is believed that the superelastic SMA particles disclosed herein may advantageously be incorporated into automotive or other structural members to form energy absorbers for damping of structurally transmitted energy, due, at least in part, to the presence of these damping characteristics.

As an example, the superelastic SMA particles may be packed in a structure, such as a constraining cylinder, in order to dissipate energy by stroking (described more fully below). The packed superelastic SMA particles may also be used as an isolation element (e.g., for seats and equipment) for mitigation of blast or impact events. In this instance, the energy absorber is used as a physical link between a vibratory input and another object, and thus serves as a load path that exhibits high energy dissipation. As such, an internal item in a vehicle (e.g., a seat or cargo container) can be at least partially isolated from an external impact and/or blast event using the example energy absorbers disclosed herein. It is to be understood, however, that the SMA particles are not limited to these examples. The particles may fill any gaps or spaces with confining boundaries to absorb energy when the boundaries are forced towards each other.

It is to be understood that while hollow SMA particles are described in detail, solid SMA particles may be used as well. In examples, all solid SMA particles, all hollow SMA particles, or a combination of solid and hollow SMA particles may be used.

It is believed that the SMA particles according to the present disclosure may dampen low frequencies, ranging from about 1 hertz to about 200 hertz for vibrations (e.g., road-induced vibrations, rigid body vibrations, etc.). The SMA particles are also capable of dampening higher frequency vibrations, and are not limited to the low frequencies set forth herein. Dampening may be achieved across wide frequency ranges, for example, when a plurality of the hollow (or solid or a combination of hollow and solid) superelastic SMA particles having a size distribution is utilized (i.e., larger particles and smaller particles) and/or when a plurality of hollow superelastic SMA particles having a wall thickness distribution is utilized (i.e., hollow particles having thinner walls and hollow particles having thicker walls). These examples are non-limiting, and it is believed that there is no upper limit on the frequency that can be dampened in impacts.

Superelastic SMAs, while in the superelastic state, are highly deformable, and exhibit shape memory characteristics. They have the ability to recover their original geometry after the deformation when subjected to an appropriate stimulus (i.e., when stress that causes the deformation is removed). It is believed that the superelastic SMA particles in the examples disclosed herein may exhibit high wear resistance, high strength, high cycle fatigue life, high fracture toughness, and/or high mechanical hysteresis (i.e., will be effective in damping vibrations and reducing sound transmission/propagation).

It is to be understood that because the superelastic form of these SMAs is substantially independent of deformation rate, the energy absorbers of the present disclosure are essentially passive devices, and no external wiring or controller is utilized for their operation.

It is further believed that the superelastic SMA particles having a hollow geometric form reduce the overall weight of the energy absorber in which they are included, and may also enhance the structural life of the energy absorber, e.g., in response to a physical impact. For instance, while exhibiting stress-induced superelasticity (which will be described in further detail below), the SMA enhances energy absorption (e.g., by the flexibility of the hollow SMA particles) when the energy absorber is exposed to some type of physical impact. The enhancement in energy absorption may thus increase a crush efficiency of the energy absorber, which may in turn increase the elastic limit and ultimate strain (i.e., the strain that the energy absorber may be subjected to before the strain overcomes the structural integrity of the energy absorber). In this way, the energy absorber including the superelastic SMA may be able to dissipate and absorb energy associated with higher energy impacts than those objects that do not include the superelastic SMAs.

It is generally known that SMAs are a group of metallic materials that are able to return to a defined shape, size, etc. when exposed to a suitable stimulus. SMAs undergo phase transitions in which yield strength (i.e., stress at which a material exhibits a specified deviation from proportionality of stress and strain), stiffness, dimension, and/or shape are altered as a function of temperature. In the low temperature or Martensite phase, the SMA is in a deformable phase, and in the high temperature of Austenite phase, the SMA returns to the remembered shape (i.e., prior to deformation). SMAs are also stress-induced SMAs (i.e., superelastic SMAs), which will be described further hereinbelow.

When the shape memory alloy is in the Martensite phase (identified as reference numeral 300 in FIG. 1) and is heated, it begins to change into the Austenite phase (identified as reference numeral 400 in FIG. 1). The Austenite start temperature ($A_s$, 400' in FIG. 1) is the temperature at which this phenomenon starts, and the Austenite finish temperature ($A_f$, 400" in FIG. 1) is the temperature at which this phenomenon is complete. When the shape memory alloy is in the Austenite phase 400 and is cooled, it begins to change into the Martensite phase 300. The Martensite start temperature ($M_s$, 300' in FIG. 1) is the temperature at which this phenomenon starts, and the Martensite finish temperature ($M_f$, 300" in FIG. 1) is the temperature at which this phenomenon finishes.

FIG. 1 illustrates a stress (identified as reference numeral 100) and temperature (identified as reference numeral 200) based phase diagram for a shape memory alloy. The SMA horizontal line (shown as reference numeral 500) represents the temperature based phase transition between the Martensitic state 300 and Austenitic state 400 at an arbitrarily selected level of stress 100. In other words, this SMA horizontal line 500 illustrates the temperature based shape memory effect previously described herein.

Superelasticity occurs when the SMA is mechanically deformed at a temperature that is above the $A_f$, 400" of the SMA. In an example, the SMA is superelastic from the $A_f$, 400" of the SMA to about $A_f$, 400" plus 50° C. The SMA material formulation may thus be selected so that the range in which the SMA is superelastic spans a major portion of a temperature range of interest for an application in which the hollow superelastic SMA particles will be used. As an example, it may be desirable to select an SMA having an $A_f$, 400" of 0° C. so that the superelasticity of the material is exhibited at temperatures ranging from 0° C. to about 50° C. Other examples of suitable SMA materials have an Austenite finish temperature $A_f$ 400" ranging from a cryogenic temperature (e.g., −150° C.) to in excess of 150° C.

This type of deformation (i.e., mechanical deformation at a temperature that is above the $A_f$ 400" of the SMA) causes a stress-induced phase transformation from the Austenite phase 400 to the Martensite phase 300 (shown at the vertical line 600 in FIG. 1). Application of sufficient stress 100 when an SMA is in its Austenite phase 400 will cause the SMA to change to its lower modulus Martensite phase 300 in which the SMA can exhibit up to 8% of "superelastic" deformation (i.e., recoverable strains on the order of up to 8% are attainable). The stress 100 in the SMA particles, as well as the particle diameter and wall thickness, may contribute to how much strain the particles can undergo while retaining their superelastic ability to return to the pre-deformed shape. For most SMA particles, a stress level at least less than 100 ksi (kilo pounds per square inch) helps the particles maintain reversible deformation cycles. For example, if the stress level is below 25 ksi, the particles can undergo millions of reversible deformation cycles.

The stress-induced Martensite phase 300 is unstable at temperatures above the $A_f$ 400" so that removal of the applied stress 100 will cause the SMA to switch back to its Austenite phase 400. The application of an externally applied stress 100 causes the Martensite phase 300 to form at temperatures higher than the Martensite start temperature (shown at reference numeral 300' in FIG. 1) associated with a zero stress state (see FIG. 1). As such, the Martensite start temperature 300' is a function of the stress 100 that is applied. Superelastic SMAs are able to be strained several times more than ordinary metal alloys without being plastically deformed. However, this characteristic is observed over a specific temperature range of $A_f$ 400" to $A_f$ 400" plus 50° C., and the largest ability to recover occurs within this range. An example of the deformation and subsequent shape recovery of one hollow superelastic SMA particle $10_1$ is shown in FIG. 2 (where T, or 200, is less than $A_f$ or 400", 100 indicates the application of stress, and the crossed out 100 indicates that the stress has been removed).

The temperature at which the SMA remembers its high temperature form may be altered, for example, by changing the composition of the alloy and through heat treatment. The composition of an SMA may be controlled to provide an $A_f$ 400" that is below the operating temperature of the application in which the particles are being used, so that the SMA particles will behave superelastically when sufficient stress is applied. In an example, the $A_f$ 400" is selected to be within about 5° C. below the operating temperature of the application in which the superelastic SMA particles are being used.

As mentioned above, the superelastic SMA particles exhibit stress-induced superelasticity when at temperatures greater than the Austenite finish temperature $A_f$ 400" of the particular SMA. Some examples of the superelastic SMA that may be used herein include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. Some specific examples include alloys of copper-zinc-aluminum-nickel, copper-aluminum-nickel, nickel-titanium, zinc-copper-gold-iron, gold-cadmium, iron-platinum, titanium-niobium, gold-copper-zinc, iron-manganese, zirconium-cobalt, zinc-copper, and titanium-vanadium-palladium. Examples of nickel-titanium based alloys include alloys of nickel and titanium, alloys of nickel, titanium, and platinum, alloys of nickel, titanium, and palladium, or alloys of nickel, titanium and at least one other metal.

Figure 2:
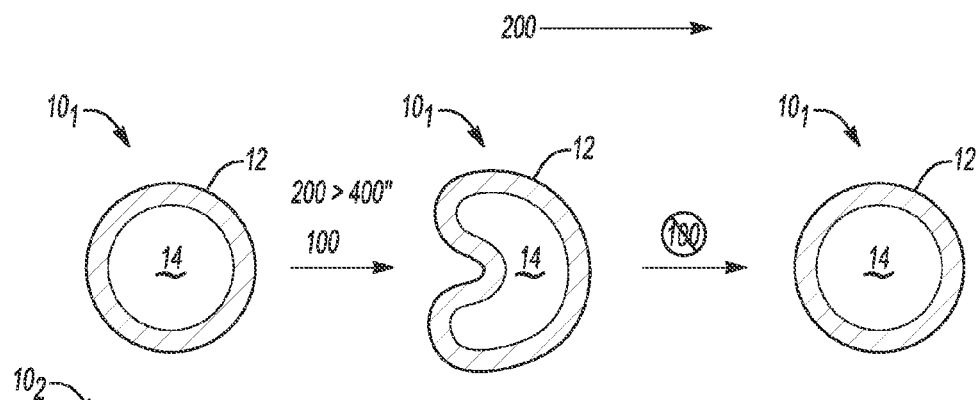
FIG. 2 is a cross-sectional, schematic illustration of the behavior of an example of the hollow superelastic SMA particle according to the present disclosure.
Figure 3:
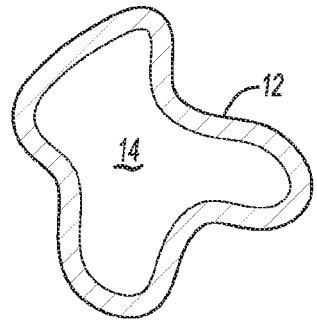
FIG. 3 is a cross-sectional view of an example of the hollow superelastic SMA particle having an irregular geometric shape.
Figure 4:
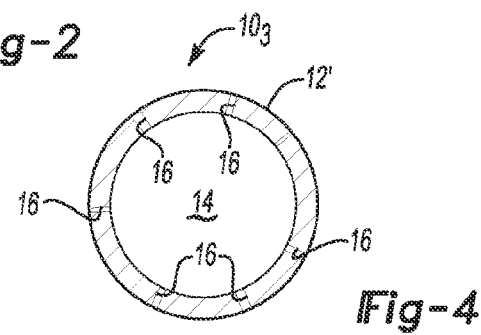
FIG. 4 is a cross-sectional view of an example of the hollow superelastic SMA particle having pores formed in the outer shell.
Figure 5:
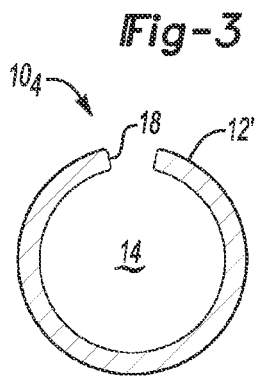
FIG. 5 is a cross-sectional view of an example of the hollow superelastic SMA particle having an incomplete outer shell.
Figure 6:
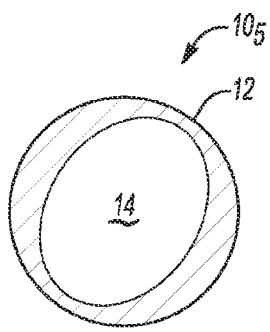
FIG. 6 is a cross-sectional view of an example of the hollow superelastic SMA particle having an outer shell with a varying wall thickness.

As shown in all of FIGS. 2 through 6, the hollow superelastic SMA particles $10_1$, $10_2$, $10_3$, $10_4$, $10_5$ include an outer shell 12 fully or partially surrounding a hollow interior 14. The outer shell 12 may be complete (shown as 12) or incomplete (12'). A complete shell 12 has a continuous, non-porous exterior. The surface of the complete shell 12 may be smooth or may have surface irregularities, such as protrusions, bumps, indentations, dimples, or cavities, formed therein. The surface irregularities of the complete shell 12 may be protrusions, bumps, etc. extending out of the surface of the complete shell or dents, cavities, dimples, etc. formed in the surface of the complete shell 12, but these irregularities do not extend through the shell 12 to the interior 14. It is believed that the presence of surface irregularities may help produce an enhanced mechanical component of interaction (mechanical interlock), which allows force to transfer between the particles more easily. Examples of complete shells 12 are shown in FIGS. 2, 3 and 6. The example shown in FIG. 3 has a deeply curved, but complete surface.

An incomplete shell 12' may include pore(s), hole(s), crack(s), void(s), gap(s), etc. that extend from the surface of the outer shell 12' through the thickness of the outer shell 12' so that the hollow interior 14 of the particle is exposed. An incomplete shell 12' may include a single pore, hole, crack, etc., or may include a plurality of pores, holes, cracks, etc. Examples of incomplete shells 12' are shown in FIGS. 4 and 5. In particular, FIG. 4 illustrates a plurality of pores 16, and FIG. 5 illustrates a single crack, break, gap, etc. 18 in the outer shell 12'.

Figure 7:
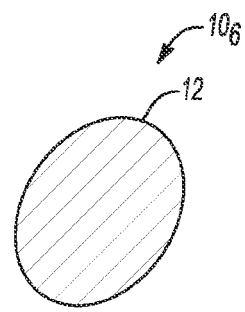
FIG. 7 is a cross-sectional view of an example of a solid superelastic SMA particle according to the present disclosure.

The superelastic SMA may have any regular geometric shape (e.g., including regular three-dimensional shapes) or any irregular geometric shape (including irregular three-dimensional shapes). As examples, the hollow superelastic SMA particles may be perfectly or imperfectly shaped hollow spheres, hollow prisms, hollow pyramids, hollow cylinders, etc. As solid particles (e.g., as shown in FIG. 7), the superelastic SMA may also take the form of a sphere (i.e., a perfectly shaped solid sphere as opposed to a hollow sphere) or may take the form of another shape (e.g., imperfectly shaped solid spheres, solid prisms, solid pyramids, solid cylinders, etc.). One example of solid particles for the superelastic SMA includes chopped wire segments. In other examples, the exterior surface of the particles may be curved, angular, or combinations thereof. An example of a hollow particle $10_1$ having a regular geometric shape is shown in FIG. 2 while an example of a hollow particle $10_2$ having an irregular geometric shape is shown in FIG. 3. In some cases, the hollow or solid particles within a plurality of particles include at least some different and random shapes (e.g., some particles are spheres, some are cylinders, some particles are irregularly shaped, etc.).

It is believed that hollow SMA particles have a relatively low mass due to a relatively thin wall (i.e., shell) thickness and a lower net density of the individual SMA particles $10_1$, $10_2$, $10_3$, $10_4$, $10_5$. In an example, if the wall thickness is less than 5% of the radius of the particle $10_1$, $10_2$, $10_3$, $10_4$, $10_5$, the mass/weight of the particle $10_1$, $10_2$, $10_3$, $10_4$, $10_5$ will be less than the mass/weight of an equivalent volume of a typical lubricating oil. As such, the hollow superelastic SMA particles $10_1$, $10_2$, $10_3$, $10_4$, $10_5$ may impart little weight to the object, material etc. in which the particles are included. In an example, if the SMA particles $10_1$, $10_2$, $10_3$, $10_4$, $10_5$ are immersed in a fluid medium, they may actually reduce the weight of the object, material, etc. in which they are included.

While the desirable wall thickness of the hollow superelastic SMA particles $10_1$, $10_2$, $10_3$, $10_4$, $10_5$ may vary depending upon the application in which the particles $10_1$, $10_2$, $10_3$, $10_4$, $10_5$ are used, as an example, the wall thickness may range from about 1 µm to about 500 nm. This range may vary depending upon the total size (e.g., the diameter measured from one side of the exterior surface to another side of the exterior surface) of the particle $10_1$, $10_2$, $10_3$, $10_4$, $10_5$. The upper limit of the wall thickness may be any thickness that is less than 100% of the radius of the particle. When the wall thickness increases, the particles tend to exhibit more stiffness. In general, stiffness approaches its greatest value when the radius of the interior 14 shrinks to nearly zero. As such, the wall thickness may be varied depending upon a desirable stiffness of the hollow superelastic SMA particles. A varying wall thickness is shown in FIG. 6, where some portions of the outer shell 12 are thicker than other portions of the outer shell 12.

In still further examples, the SMA particles may be solid, as shown in FIG. 7. In these examples, the SMA particle $10_6$ is formed in a substantially unitary construction. In this way, the solid SMA particle $10_6$ may have the same composition throughout the particle, for example, from a center portion to the outside of the particle.

It is to be understood that the size of the SMA particles 10 (note that reference to SMA particles 10 means any one or more of SMA particles $10_1$, $10_2$, $10_3$, $10_4$, $10_5$, and $10_6$) used in a single application may be relatively consistent or may vary (i.e., a distribution of particle sizes may be used). The particle size generally refers to the diameter of the particle 10 measured from one point on the exterior surface of the outer shell 12, 12' to another point on the exterior surface of the outer shell 12, 12'. When the particle has an irregular shape, an average diameter may be taken to determine the size of the particle. For prism shaped and pyramid shaped particles, the size may be determined using the volume. As an example, the particles 10 disclosed herein may have a size ranging from about 20 µm to about 20 mm. The size of the SMA particles 10 may also depend upon the application in which the SMA particles 10 are to be used.

While a variety of different shapes and configurations of the SMA particles 10 have been described, it is to be understood that the form of the SMA particle 10 may be dictated by the application in which the particle 10 is to be used. For example, superelastic SMA particles having a complete shell 12 may be desirable in applications where light weight is desirable. For another example, SMA particles 10 having varying sizes and wall thicknesses may be desirable in applications in which it is desirable to dampen multiple forcing frequencies, such as multiple acoustic frequencies.

In still other examples, the outer shell 12 or 12' surrounds an interior material (not shown) that is present in the hollow interior 14. In these examples, the particles are no longer hollow, but rather the superelastic SMA outer shell 12, 12' forms a skin on another core material. The core material present in the interior 14 may be selected from a variety of materials.

In an example, the core material may be a sacrificial scaffolding/template that enables the formation of the outer shell 12, 12'. In this example, if the outer shell is an incomplete outer shell 12', then the sacrificial scaffolding/template may be removed through the pore(s), hole(s), etc. to obtain the hollow particle. Removal of the sacrificial scaffolding/template may depend upon the material of which the scaffolding/template is formed. As an example, removal may be accomplished if the sacrificial scaffolding/template is a brittle material, such as a ceramic. In this case, deforming the shell 12' will cause the scaffolding/template to break. Performing deformation multiple times may break the scaffolding/template into small particles that can be removed through the pore(s), hole(s), etc. The sacrificial scaffolding/template may also be made of a material that can be dissolved by a suitable chemical. For example, a scaffolding/template made of iron could be dissolved by adding cola and then pouring the dissolved contents out of the pore(s), hole(s), etc. to obtain the hollow interior 14.

For another example, the core material may be a foam material or a solid material. In some instances, the density of the core material is greater than the density of the superelastic SMA outer shell 12, 12'; and in other instances, the density of the core material is less than the density of the superelastic SMA outer shell 12, 12'. The core material may also be a hollow particle upon which the superelastic SMA outer shell 12, 12' is formed. In these instances, the hollow core material may be formed of ceramic, metal, glass, or another material surrounding a hollow interior.

In another example, the hollow SMA particles $10_1$, $10_2$, $10_3$, $10_4$, $10_5$ are prepared by obtaining hollow sacrificial substrates, which are commercially available, such as hollow aluminum oxide or glass spheres. Then, SMA materials may be spray deposited on the hollow sacrificial substrates. In an example, the SMA materials may be composed of nickel and titanium powders (or other SMA material powders, such as indium and titanium, nickel and aluminum, etc.) present in about an equal mass percentage and having a size of less than or equal to about 2 microns to 3 microns. The SMA material may also be a powdered nickel-titanium alloy containing about an equal atomic proportion (within 1% to 0.1% depending on the desired phase transition temperature) of two or more materials (e.g., Ni and Ti). Then, an annealing step is performed by heating the spheres. For nickel-titanium spheres, the temperature for annealing is at least 400° C.

Figure 8:
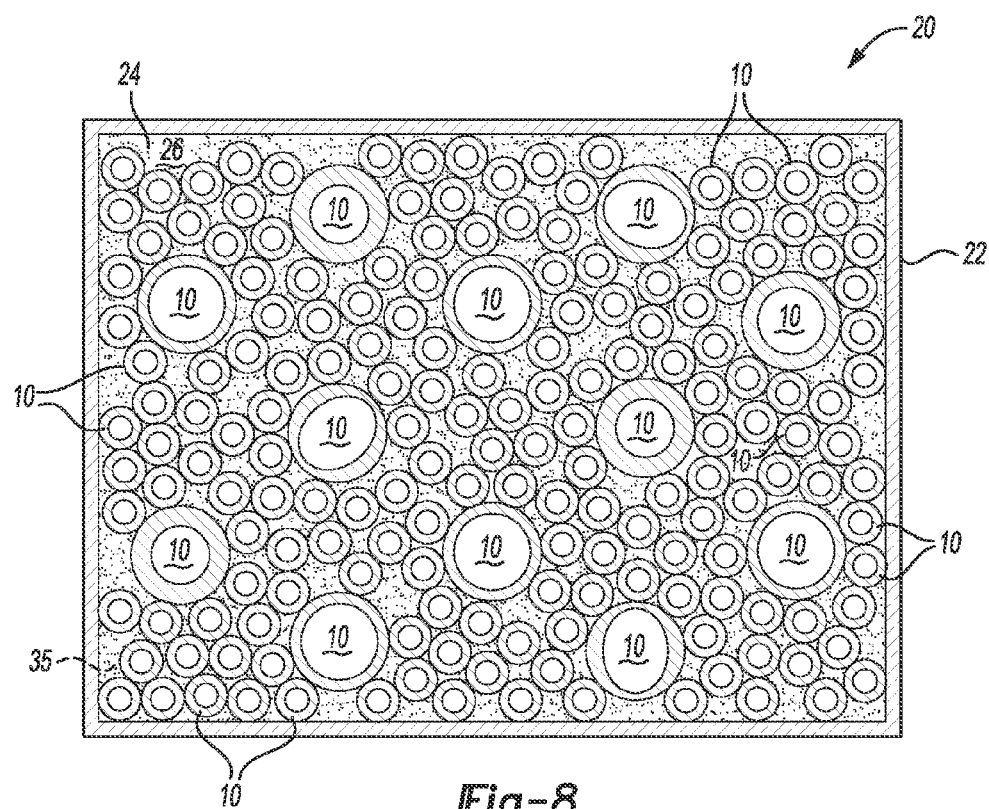
FIG. 8 is a semi-schematic cross-sectional view of a portion of an example of an energy absorber with examples of the hollow superelastic SMA particles.

Now referring to FIG. 8, a portion of an example of an energy absorber 20 with the SMA particles 10 is depicted. The energy absorber 20 includes a structure 22 defining a hollow interior portion 24. The structure 22 may have any suitable geometry, as long as there are two rigid boundaries that are forced toward each other during an impact event and as long as the hollow interior portion 24 is formed. The structure 22 may also be formed of any suitable material. Both the shape and the material of the structure 22 depend, at least in part, upon the application in which the energy absorber 20 is used. For example, the shape of the energy absorber used in a vehicle seat may be different from the shape of the energy absorber used in a cargo container.

A working volume 26 is defined in at least a portion of the hollow interior portion 24. SMA particles 10 are positioned in contact with one or more neighboring particles within the working volume 26 and are retained therein, for example, by the walls of the structure 22. The working volume 26, as the term is used herein, is the volume of the energy absorber 20 in which energy damping occurs as a result of the SMA particles 10. It is to be understood that the working volume 26 may be completely full of tightly packed SMA particles 10, where the percentage of particles 10 in the working volume 26 corresponds to the particle size. The smaller particle size allows for more particles 10 to be packed within the working volume 26, at least in part because interstitial spaces (i.e., voids) between the particles 10 are reduced. For example, the working volume 26 being completely full of SMA particles 10 means that without external pressure, the SMA particle volume percentage is as high as possible without deforming the SMA particles 10.

Various configurations and combinations of SMA particles 10 may be used in the energy absorbers 20 disclosed herein. In an example, the SMA particles 10 may be uniform in size and/or shape, or may have a distribution of sizes as discussed above. FIG. 8 shows an example of hollow SMA particles 10 having a variety of sizes (e.g., at least two different sizes). In each of the examples disclosed herein, it is to be understood that the SMA particles 10 have an Austenite finish temperature ($A_f$) that is lower than a temperature encountered in an application in which the energy absorber 20 is used so that the SMA particles 10 exhibit stress-induced superelasticity, as discussed above.

It is to be understood that FIG. 8 depicts a relatively generic example of the energy absorber 20, and more specific examples are described in reference to FIGS. 9A, 9B, 10, and 11.

Figure 9A:
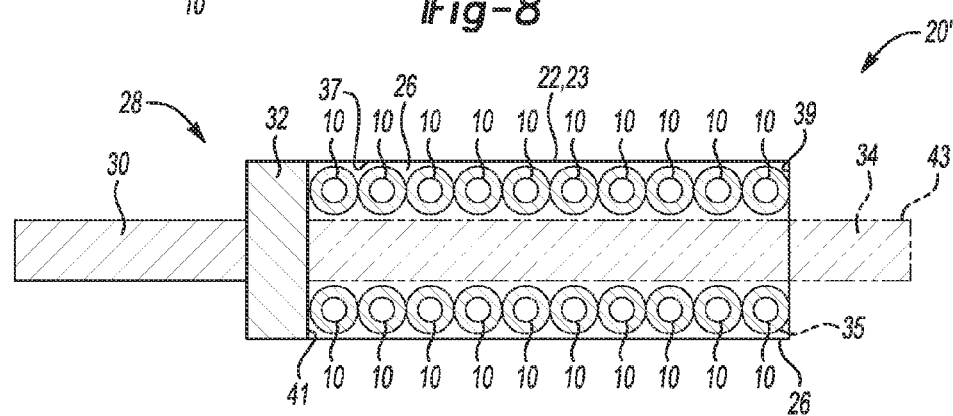
FIGS. 9A and 9B are semi-schematic cross-sectional views of examples of an energy absorber according to the present disclosure before (FIG. 9A) and after (FIG. 9B) an interactive force acts on a reactor of the energy absorbers.
Figure 9B:
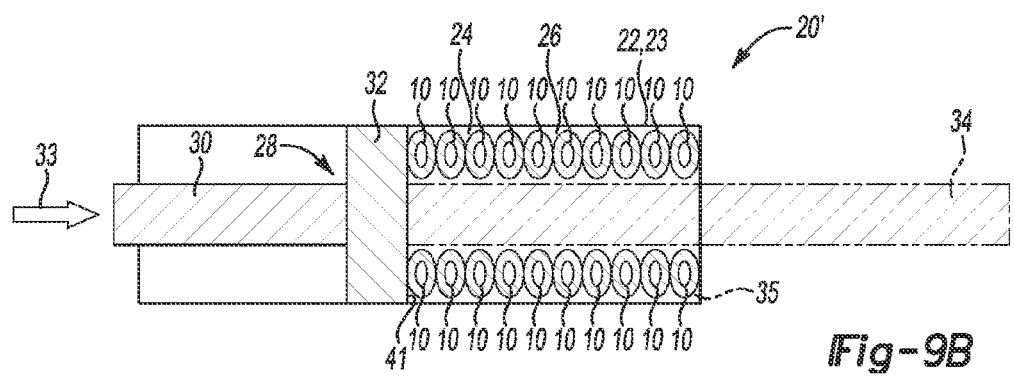

FIGS. 9A and 9B depict an example of the energy absorber 20' both before and after exposure to an excitation source (represented by the arrow 33 in FIG. 9B). This example of the energy absorber 20' includes a reactor 23 and an actuator 28. In this example, the reactor 23 serves to receive force applied to at least some of the SMA particles 10 from the actuator 28. The actuator 28 may be exposed to an excitation source. The excitation source may be energy resulting from an impulse/impact, acoustic vibrations, noise, or road-induced periodic vibrations. Upon exposure of the actuator 28 to the excitation source 33, the actuator 28 forcefully communicates with the SMA particles 10 present in the working volume 26. When exposed to the force, the SMA particles 10 exhibit superelastic deformation, and thus serve as an energy dissipating element of the energy absorber 20'.

The reactor 23 of the energy absorber 20' is the structure 22. In the example of FIGS. 9A and 9B, the reactor 23 is a cylinder which is configured to receive the actuator 28 (e.g., a piston assembly). While the reactor 23 in this example is cylindrical, it is to be understood that any of the shapes previously described for the structure 22 may be utilized.

The reactor 23 may be made of any material having sufficient rigidity so that it does not deform appreciably under the forces that are transmitted therethrough. Sufficient rigidity is a combination of both wall thickness and the elastic modulus of the material of which the reactor 23 is made. The combination of boundary wall thickness and material elastic modulus render the walls of the reactor 23 stiffer than the superelastic particles 10 that fill the cavity so that it is the particles 10 that deform under the applied loads to a significantly greater extent than the reactor boundary walls. As such, large energy dissipation comes principally from deformation cycles of the superelastic SMA particles 10.

The actuator 28 of energy absorber 20' may have a first portion 30 and a second portion 32. The first portion 30 may be connected directly to the second portion 32. In the example shown in FIGS. 9A and 9B, the actuator 28 is the piston assembly, in which the first portion 30 may be a piston rod and the second portion 32 may be a piston head. The second portion 32 may be positioned at one end of the reactor 23, and the first portion 20 may be configured to be moved into and out of the hollow interior portion 24 of the reactor 23. In this example, the first portion 30 moves axially through the hollow interior portion 24 in response to the excitation source (33, as shown in FIG. 9B), which in turn forces the second portion 32 to communicate with at least a portion of the SMA particles 10 that are present within the hollow interior portion 24. More specifically, the energy absorber 20' allows the axial stroking of the piston assembly (i.e., actuator 28). The stroking deforms the SMA particles 10, which dissipate the energy.

The example shown in FIGS. 9A and 9B illustrates two different working volumes 26. In a first example, the extension piece 34 (shown in phantom) is not present. In this example, the working volume 26 is defined by an interior surface 37 of the reactor 23, an end 39 of the reactor 23, and a surface 41 of the second portion 32 of the actuator 28. In this example, the second portion surface 41 faces the SMA particles 10 in the reactor 23, and defines one end of the working volume 26. While not shown, it is to be understood that when the extension piece 34 is not present, the SMA particles 10 may extend into this section of the working volume 26.

In a second example, the energy absorber 20' may include the extension piece 34 to interact with another mechanism (not shown). The extension piece 34 may be, for example, a physical link to a vehicle structure or an interior element, such as a seat support. In examples including the extension piece 34, the working volume 26 is defined between the interior surface 37 of the reactor 23 and at least part of an exterior surface 43 of extension piece 34. As illustrated in FIGS. 9A and 9B, the working volume 26 is also defined by a portion of the SMA particle facing surface 41 of the second portion 32 of the actuator 28 and the end 39.

It is to be understood that the energy absorber 20' may be vented or sealed with respect to an external environment (i.e., an ambient space outside of the working volume 26). In these examples, the SMA particles 10 are retained within the working volume 26 while air may be vented out to an environment outside of the working volume 26.

Figure 10:
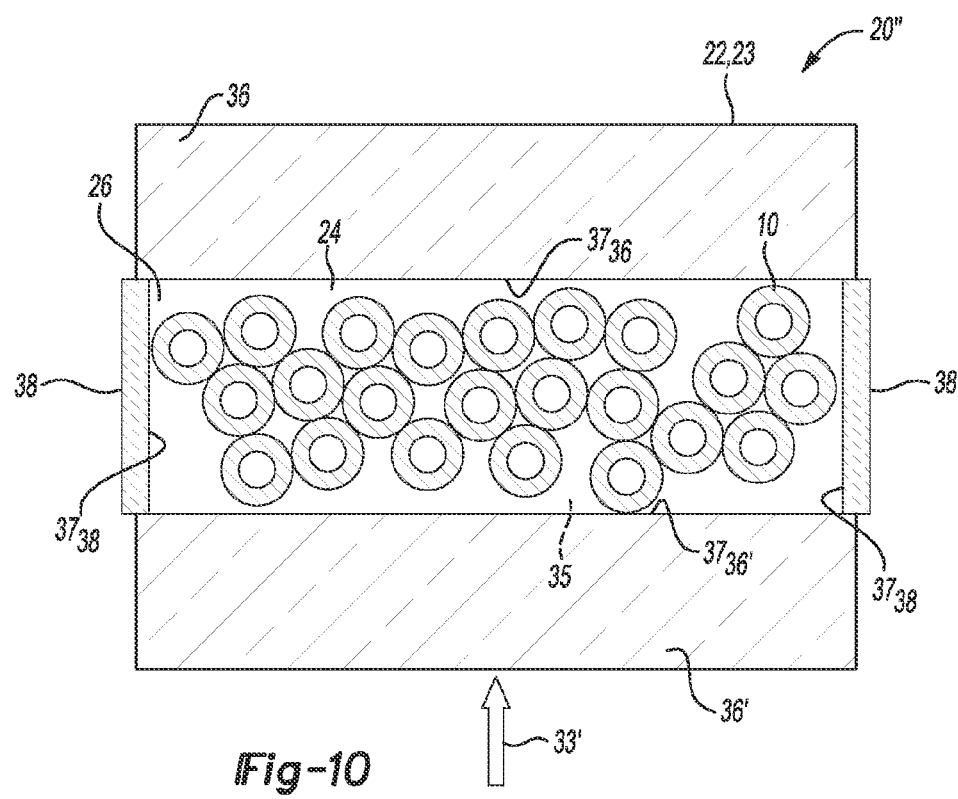
FIG. 10 is a semi-schematic cross-sectional view of an example of another energy absorber according to the present disclosure, this example including hollow superelastic SMA particles and resilient walls.

FIG. 10 depicts another example of the energy absorber 20" including the SMA particles 10. Note that for clarity only one SMA particle 10 is labeled in FIG. 10. The structure 22 of the energy absorber 20" has opposed ends 36, 36' that abut the hollow interior portion 24. The opposed ends 36, 36' may be respective layers having any suitable thickness and formed of any material, including, for example, metals, plastics, or composite materials. In an example, the opposed ends 36, 36' may be sealingly connected by a wall. As will be discussed below, the wall may be made of a resilient material 38, which is sufficiently stiff so as to exhibit minimal deformation in response to forces transmitted through the particles 10 under impact loading. In an example, an adhesive may be used to sealingly connect the ends 36, 36' to the resilient material 38. In other examples, the wall may engage the opposed ends 36, 36', but may also be moveable with respect to the opposed ends 36, 36'.

In an example, the combination of thickness and material selected for the opposed ends 36, 36' renders the ends 36, 36' essentially rigid, such that the ends 36, 36' exhibit little to no deformation when forces are transmitted through the SMA particles 10. In examples in which one or more of the opposed ends 36, 36' or other surface bounding the hollow interior portion 24 (e.g., wall or resilient material 38) is free to move with respect to the other bounding surface(s), it is principally through the deformation of the superelastic SAM particles 10, rather than deformation of the bounding surface(s), that energy dissipation occurs. In other instances in which the bounding surfaces (e.g., wall or resilient material 38 and ends 36, 36') are physically attached to each other, then energy dissipation initiates through inward deformation of at least one of the bounding surfaces into the hollow interior portion 24. In these instances, it is desirable that the opposed end 36, 36' that is exposed to the load be flexible enough to permit deformation of, and thus energy dissipation in, the superelastic SMA particles 10 contained within the hollow interior portion 24.

The opposed ends 36, 36' may have any suitable size and/or shape, which may depend upon the application in which the energy absorber 20" is to be used.

The working volume 26 of the energy absorber 20" is defined in the entire hollow interior portion 24. In this example, the working volume 26 is defined by the interior surfaces $37_{36}$, $37_{36'}$ of the ends 36, 36' and the interior surface(s) $37_{38}$ of the resilient material(s) 38. The SMA particles 10 are sealed within the working volume 26.

It is to be understood energy absorber 20" has no separate component acting as the previously described actuator 28. In other words, an excitation source 33' is applied directly to the structure 22. In the example shown in FIG. 10, the opposed end 36' may be compressed upon exposure to the excitation source 33', and the resilient material 38 flexes under the load. As a result, the SMA particles 10 will deform, absorbing energy from the impact or vibration. During operation of the energy absorber 20", it is to be understood that the working volume 26 may be conserved, compressed, or enlarged. For example, one of the opposed ends 36' may advance toward the other opposed end 36 and the resilient material 38 may flex outward (away from the working volume 26) under pressure. As such, the working volume 26 may increase or decrease with deformation of the energy absorber 20". The shape depicted in FIG. 10 is not limited to a cylindrical shape. It is to be understood that any shape is suitable if the shape has confining walls, which are rigid enough to transmit force generated from impact loads to the SMA particles 10.

Figure 11:
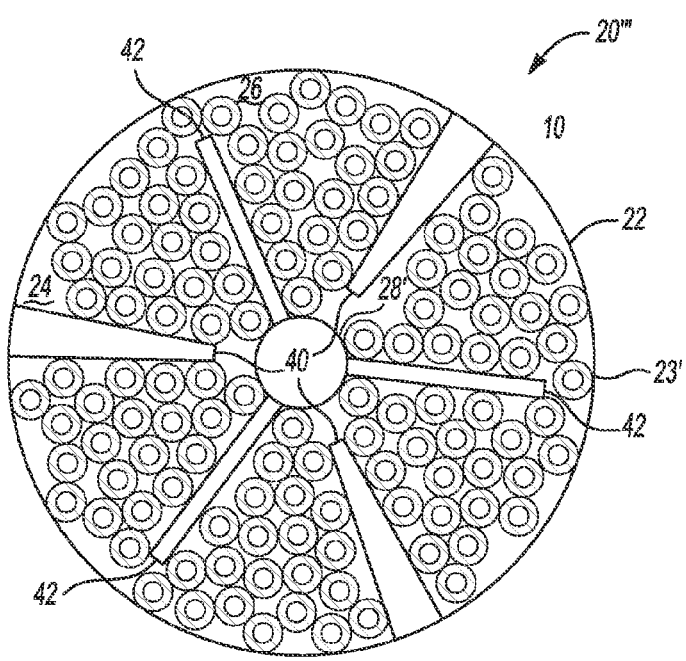
FIG. 11 is a semi-schematic cross-sectional view of an example of an energy absorber with an axially rotating actuator according to the present disclosure.

FIG. 11 depicts an example of an energy absorber 20''' that absorbs rotational energy. The energy absorber 20''' includes a reactor 23' and an impeller rod 28' serving as a rotational actuator. The impeller rod 28' serves to input a rotational force into the energy absorber 20'. The impeller rod 28' may include one or more impeller blades 42 extending radially outward therefrom. The reactor 23' may be a cylinder having one or more radial vanes 40 extending radially inward from the cylinder wall.

The energy absorber 20''' also includes the SMA particles 10 positioned within a working volume 26 defined between the interior surfaces of the reactor 23' and the exterior surfaces of the impeller rod 28'. The SMA particles 10 receive a reaction force from the impeller rod 28' and impeller blades 42. Rotation of the impeller rod 28' disturbs and deforms SMA particles 10 within the working volume 26 against the one or more radial vanes 40 of cylinder of reactor 23'. The components (e.g., 23', 28', 40) of the energy absorber 20''' have a sufficiently rigid structure to prevent deformation under the loading forces applied during a specific application.

In the examples of the energy absorber 20, 20', 20", 20''' disclosed herein, it is to be understood that the SMA particles 10 may be suspended in a fluid that is incorporated into the working volume 26 of the structure 22. The fluid may assist in more uniformly loading the SMA particles 10 so that their deformation may be more global, as opposed to local deformation resulting from direct contact with neighboring particles 10. An example of the fluid is shown in FIG. 8 by the speckles labeled 35. While the speckles are not shown in FIGS. 9A, 9B, 10, and 11, fluid 35 may or may not be utilized in these examples. Examples of the fluid include water, oil, gas or any other type of fluid.

It is to be understood that deformation of SMA particles 10 within the working volume 26 may be due to direct contact with another component of the energy absorber 20, 20', 20", 20''' or may be due to indirect contact with forces exerted upon the working volume 26. As shown in FIG. 10, an example of direct contact is when the structure 22 directly contacts and deforms one or more of the SMA particles 10. Additionally, deformation of the SMA particles 10 may occur indirectly by pressurization of the SMA particles 10 within the working volume 26. Further, the SMA particles 10 may contact each other upon exposure of the actuator 28 to the excitation source 33, 33', which results in the deformation.

It is to be understood that multiple energy absorbers 20, 20', 20", 20''' may be arranged in series or in parallel with one another for application specific design requirements. For example, two or more energy absorbers 20, 20', 20", 20''' may be stacked upon one another in series such that the input/output is sequential. In many examples, the energy absorbers 20, 20', 20", 20''' are arranged in parallel, however it is to be understood that the energy absorbers 20, 20', 20", 20''' are not limited to a specific arrangement.

In some applications, energy absorbers 20, 20', 20", 20''' may generate sufficient heat over multiple deformation events to raise the temperature to a high level (e.g., above 200° C. for NiTi SMA particles, although higher temperatures are contemplated for other SMAs). In such cases, the high temperature may decrease the life cycle of the SMA particles. In these situations, the SMA particles can be surrounded by or immersed in a fluid bath (or other common heat sink) to help directly, e.g., through conductive heat transfer, cool the particles.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Further, the terms "first," "second," and the like herein do not denote any order, quantity, or importance, but rather are used to distinguish one element from another. Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Still further, it is to be understood that the ranges provided herein include the stated range and any value or sub-range within the stated range. For example, a range from about 0° C. to about 50° C. should be interpreted to include not only the explicitly recited limits of about 0° C. to about 50° C., but also to include individual values, such as 25° C., 33° C., 43.5° C., 48° C., etc., and sub-ranges, such as from about 15° C. to about 45° C., from about 18° C. to about 35° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described, it will be apparent to those skilled in the art that the disclosed examples may be modified. Therefore, the foregoing description is to be considered non-limiting.

The invention claimed is:

1. An energy absorber, comprising:
a structure defining a hollow interior portion;
a working volume defined in at least a portion of the hollow interior portion; and
shape memory alloy (SMA) particles positioned within the working volume, the SMA particles having an Austenite finish temperature ($A_f$) that is lower than a temperature encountered in an application in which the energy absorber is used so that the SMA particles exhibit stress-induced superelasticity, wherein at least some of the SMA particles are solid.

2. The energy absorber as defined in claim 1 wherein:
the structure is a reactor;
the energy absorber further comprises an actuator having a first portion, a second portion operatively connected to the first portion and to forcefully communicate with at least a portion of the SMA particles, and an extension piece operatively connected to the second portion and positioned at least partially in the working volume; and
the working volume is further defined between an exterior surface of the extension piece of the actuator and an interior surface of the reactor.

3. The energy absorber as defined in claim 2 wherein the reactor is a valve and the actuator is a piston assembly including a piston rod as the first portion and a piston head as the second portion.

4. The energy absorber as defined in claim 2 wherein the first portion of the actuator is positioned to be exposed to an excitation source.

5. An energy absorber, comprising:
a structure defining a hollow interior portion, wherein the structure is a cylinder having radial vanes extending radially inward from a wall of the cylinder;
a working volume defined in at least a portion of the hollow interior portion;
shape memory alloy (SMA) particles positioned within the working volume, the SMA particles having an Austenite finish temperature ($A_f$) that is lower than a temperature encountered in an application in which the energy absorber is used so that the SMA particles exhibit stress-induced superelasticity; and
a rod with impeller blades positioned within the cylinder; wherein the working volume is defined between the cylinder and the rod.

6. The energy absorber as defined in claim 1 wherein:
the structure is a reactor;
the energy absorber further comprises an actuator having a first portion and a second portion operatively connected to the first portion and to forcefully communicate with at least a portion of the SMA particles; and
the working volume is further defined between an SMA particle facing surface of the second portion of the actuator and an interior surface of the reactor.

7. The energy absorber as defined in claim 6 wherein the reactor is a valve and the actuator is a piston assembly including a piston rod as the first portion and a piston head as the second portion.

8. The energy absorber as defined in claim 1 wherein some of the SMA particles are hollow.

9. The energy absorber as defined in claim 8 wherein the SMA particles have a distribution of wall thicknesses.

10. The energy absorber as defined in claim 1 wherein the SMA particles are spherical, randomly shaped, or combinations thereof.

11. The energy absorber as defined in claim 1 wherein the SMA particles have a distribution of sizes.

12. The energy absorber as defined in claim 1 wherein the SMA particles are suspended in a fluid incorporated into the structure.

13. The energy absorber as defined in claim 1 wherein the working volume is defined in the entire hollow interior portion.

14. The energy absorber as defined in claim 13 wherein the structure has opposed ends that abut the hollow interior portion, and wherein the energy absorber further comprises a resilient wall sealingly connected to each of the opposed ends, and wherein one of the opposed ends acts as an actuator to forcefully communicate with at least some of the SMA particles.

15. The energy absorber as defined in claim 1 wherein the SMA particles absorb periodic vibration within a range from about 1 hertz to about 200 hertz.

16. The energy absorber as defined in claim 1 wherein the SMA particles absorb random vibration.

17. The energy absorber as defined in claim 1 wherein the SMA particles have surface irregularities.

18. The energy absorber as defined in claim 1 wherein the SMA particles are cylinders, irregularly shaped, or combinations thereof.

* * * * *